United States Patent Office 3,428,876
Patented Feb. 18, 1969

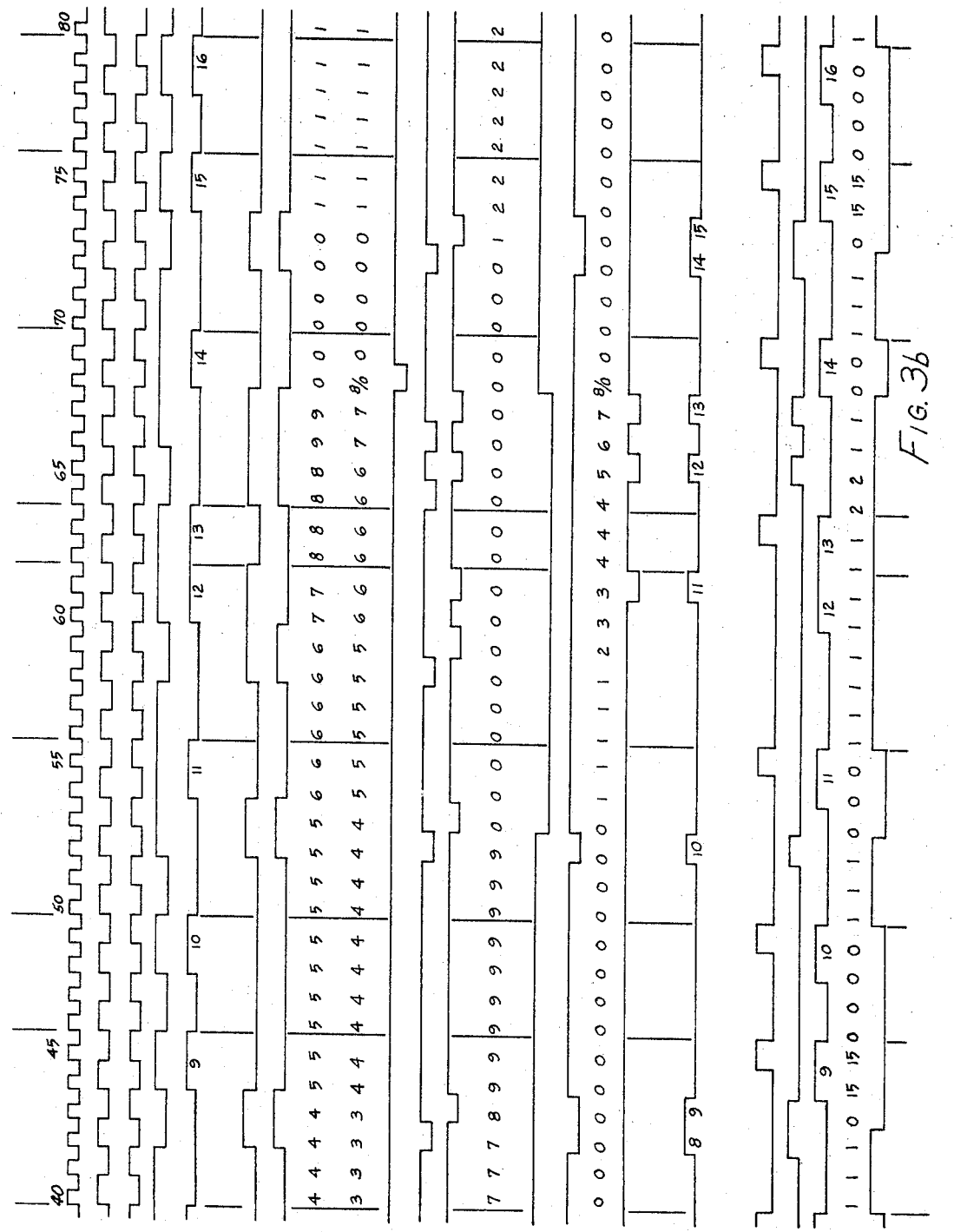

3,428,876
ABSOLUTE FEEDRATE VELOCITY CONTROL FOR MULTIAXES PULSE RESPONSIVE SERVO USING ALL DIGITAL CIRCUITRY
Leroy U. C. Kelling, Waynesboro, Va., assignor to General Electric Company, a corporation of New York
Filed Jan. 18, 1965, Ser. No. 426,343
U.S. Cl. 318—18          10 Claims
Int. Cl. G05b 15/02, 11/14

ABSTRACT OF THE DISCLOSURE

This invention concerns a numerical multiaxes feedrate velocity controlled machine tool. In systems of this type, sequential blocks of numerical information provide pulse rates to each axis which determines the velocity of each axis for each block. If the square root of the sum of the squares of all axes pulse rates is taken, this will provide absolute feed rate which may exceed a safe limit. Therefore, the absolute rate is compared with a fixed reference to limit it to a safe value. This system is an improvement over prior systems since the absolute feedrate is determined and limited by digital means.

---

The invention relates to an absolute feedrate velocity control for numerical contouring controls, and particularly to such a velocity control for controlling the resultant linear velocity of a machine tool or workpiece along a contouring path and in accordance with a specified linear velocity.

Numerical contouring controls are used to shape or contour a workpiece by controlling the relative movement of the workpiece and a tool such as a rotating milling cutter. The numerical contouring control causes this relative movement to follow a commanded path which is numerically indicated in some storage medium. The numerical contouring control uses a time-based, feedrate number to command the control system to produce the desired resultant contouring velocity of the relative movement. Normally, this feedrate number is computed by a programmer for each block of contouring data. While, in some instances, this computation may be relatively simple, the computation may be different for different types of numerical contouring controls. Thus, a set of data which will produce a desired resultant contouring velocity of relative movement for one type of numerical contouring control may not produce the same desired relative resultant velocity for another type of numerical contouring control. However, if the resultant contouring velocity of relative movement is expressed in absolute terms (i.e., inches per minute), this expression of the velocity may be interchangeably used with all types of numerical contouring controls.

Therefore, an object of the invention is to provide a numerical contouring control which causes the resultant linear contouring velocity of relative movement to conform with a programmed linear velocity.

Another object of the invention is to provide a numerical contouring control which operates in response to a programmed absolute velocity of relative movement in inches per minute.

Another object of the invention is to provide an improved numerical contouring control that can selectively operate from a time-based, feedrate number command or from an absolute feedrate velocity command.

The invention is intended to be used with a numerical contouring control for producing relative motion of a tool and workpiece along a path. In a typical prior control, the resultant contouring velocity of relative movement has been usually expressed as a feedrate number. This feedrate number is the resultant contouring velocity modified by the contouring radius or slope length and by any particular characteristics of the control. The feedrate number is indicated by the rate or duration of contouring velocity signals. A contouring function generator resolves these contouring velocity signals into two or more components of signals having respective rates or durations indicative of the commanded path direction with respect to two or more mutually perpendicular axes. In accordance with the invention, the two components of signals are combined in a vector pulse computer that produces feedback or output signals having rates or durations indicative of the vector sum of the two components of the signals. The output signals are compared with the contouring velocity signals in a comparison circuit. On the basis of this comparison, the comparison circuit produces enabling signals which control the contouring function generator to maintain the resultant rate or duration of the output signals the same as the rate or duration of the absolute contouring velocity signal. Thus, the contouring function generator is enabled to produce component signals which have a vector resultant that is the same as the contouring velocity signals. Since the resultant is maintained at the same time duration or rate, the contouring velocity signals may then be specified in absolute velocities.

The invention is particularly pointed out in the claims. The invention may be better understood from the following description given in connection with the accompanying drawing, in which:

FIGURES 3a and 3b show waveforms which illustrate the operation of the absolute feedrate velocity control of the invention.

General description

Figure 1:
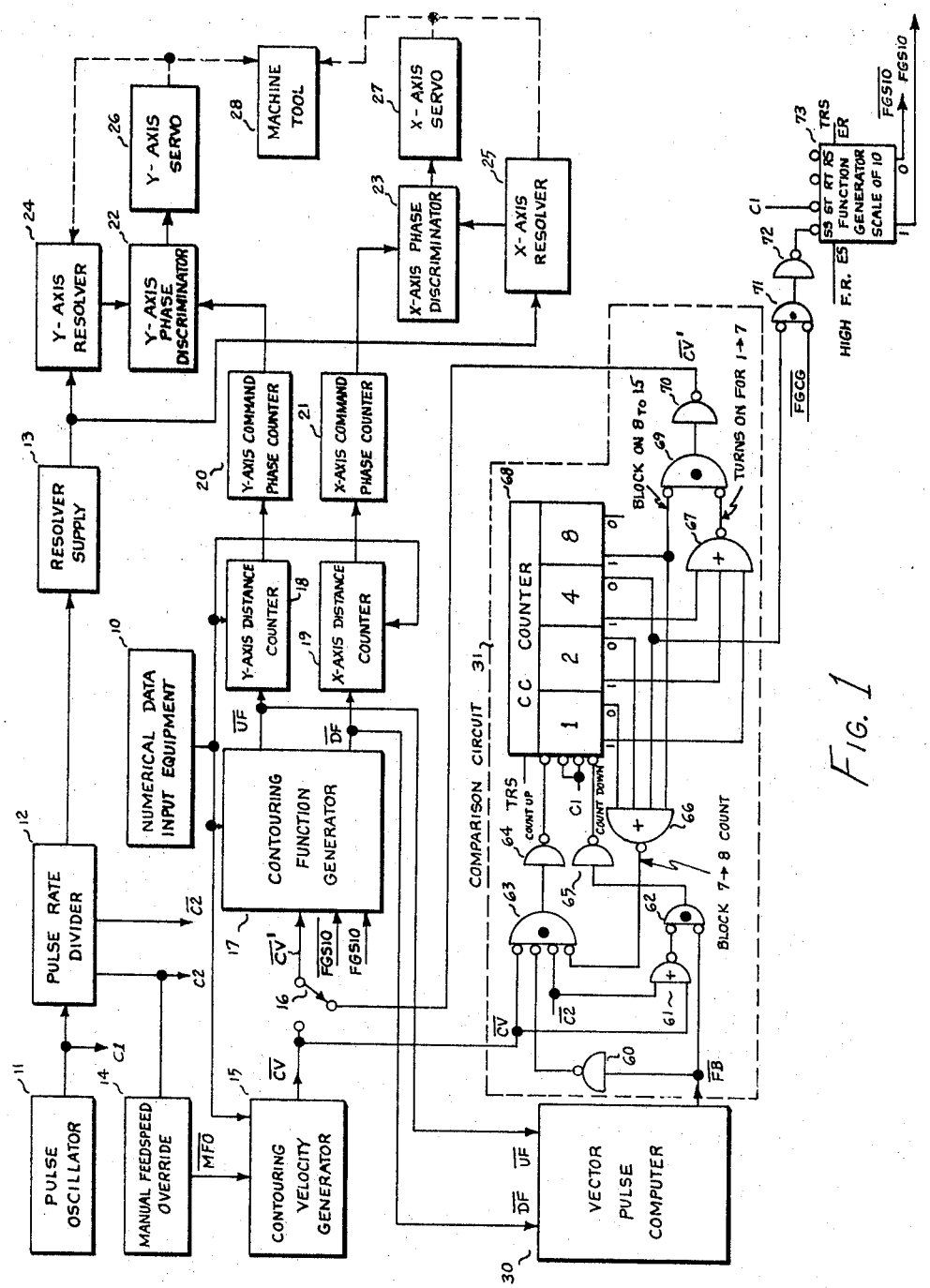
FIGURE 1 shows a block diagram of a numerical contouring control system, and shows a diagram, partly in circuit diagram and partly in block diagram, of the absolute feedrate velocity control of the invention.

The numerical contouring control system shown in FIGURE 1 is known in the art. The system shown has been assumed to provide an X axis of motion and a Y axis of motion, these axes usually being mutually perpendicular, and generally lying in a plane. However, more or less axes of motion may be provided. The combined motion along the axes provides the resultant motion. The system is provided with numerical command information supplied by numerical data input equipment 10. This information may be on a punched tape, a punched card, a magnetic tape, or on some other medium. Typically, this information indicates the desired speed of relative movement of a tool (such as a milling machine cutter) and a workpiece, and the desired direction of the path of relative movement of the tool and workpiece. The numerical data input equipment 10 reads the commanded information and stores this information in the various command areas of the control for controlling the system and relative movement of the tool and workpiece. The system utilizes pulses or trains of pulses which convey or indicate the commanded information, and which are usually square-wave pulses which vary between logic 0 and logic 1. These pulses are produced by a basic frequency pulse oscillator 11 at a C1 rate which typically is 250 kilocycles. This C1 rate is divided or reduced by a pulse rate divider 12 which produces pulses at various rates including the C2 rate and the $\overline{C2}$ rate as indicated. In the following description, the suffix numeral on the rate indicates the fractional portion of the basic C1 rate. Thus, pulses at the C2 rate would have a rate or frequency of one-half the C1 rate, or 125 kilocycles. The overline indicates a logic inversion. The pulse rate divider 12 also supplies 250 cycle pulses to a resolver supply 13 which produces 250 cycle sine and cosine signals for use in the servo portion of the system.

The C2 pulses from the pulse rate divider 12 are supplied to a manual feed speed override 14 which is provided so that an operator can manually control the speed of relative movement to some percent of the programmed value. The $\overline{\text{MFO}}$ pulses from the manual feed speed override 14 are supplied to a contouring velocity generator 15 which modifies the incoming pulses $\overline{\text{MFO}}$ from the manual feed speed override 14 by an amount called for by the numerical data input equipment 10, and provides contouring velocity pulses $\overline{\text{CV}}$. In a typical numerical contouring control system without the absolute feedrate velocity control of the invention, the contouring velocity pulses $\overline{\text{CV}}$ have a rate which is proportional to the commanded linear velocity in inches per minute and which is inversely proportional to the radius or slope length of the commanded contour in inches. However, with the absolute feedrate velocity control of the invention, the contouring velocity pulses $\overline{\text{CV}}$ may be directly proportional to the commanded feed speed in inches per minute.

The contouring velocity pulses $\overline{\text{CV}}$ may be supplied through the absolute feedrate velocity control of the invention to a contouring function generator 17, or may be supplied directly to the contouring function generator 17 through a switch 16. The contouring function generator 17 resolves the contouring velocity pulses $\overline{\text{CV}}$ into Y and X components of pulses which have rates or time durations respectively indicative of the velocity of motion to be provided along the Y and X axes. These components of pulses are indicated as $\overline{\text{UF}}$ and $\overline{\text{DF}}$ and are applied to Y and X distance counters 18, 19. Information is supplied to the distance counters 18, 19 to limit the distance traveled in a given operation to some predetermined absolute point so that errors do not accumulate. Thus, after the predetermined number of $\overline{\text{UF}}$ or $\overline{\text{DF}}$ pulses have passed through the respective distance counters 18, 19, the distance counters 18, 19 prevent further pulses from passing and stop motion along their respective axes.

The pulses passed by the Y and X distance counters 18, 19 have the same rate or time durations as the respective $\overline{\text{UF}}$ and $\overline{\text{DF}}$ pulses. These pulses are respectively applied to Y and X command phase counters 20, 21 which convert the applied pulses to respective signals each having a significant phase or time occurrence. These phase significant signals are applied to respective Y and X phase discriminators 22, 23.

The phase discriminators 22, 23 compare the phases of signals from the respective Y and X phase counters 20, 21 with the phases of signals from Y and X resolvers 24, 25, and produce control signals which are applied to Y and X servos 26, 27. These servos 26, 27 produce motion of a machine tool 28 in the Y and X directions. The Y and X servos 26, 27 also move or operate the Y and X resolvers 24, 25. As the resolvers 24, 25 move, the respective phases of their output signals shift. As long as a difference in phase exists between the two signals supplied to a phase discriminator, motion is called for. This condition causes motion of the machine tool 28 and the resolvers 24, 25. If the system is operating properly, no further motion signals are produced after the time that the machine tool 28 reaches its commanded or desired position. When both axes reach a commanded position, a new block of data is inserted and motion resumes on a path indicated by the new block of data.

Figure 2:
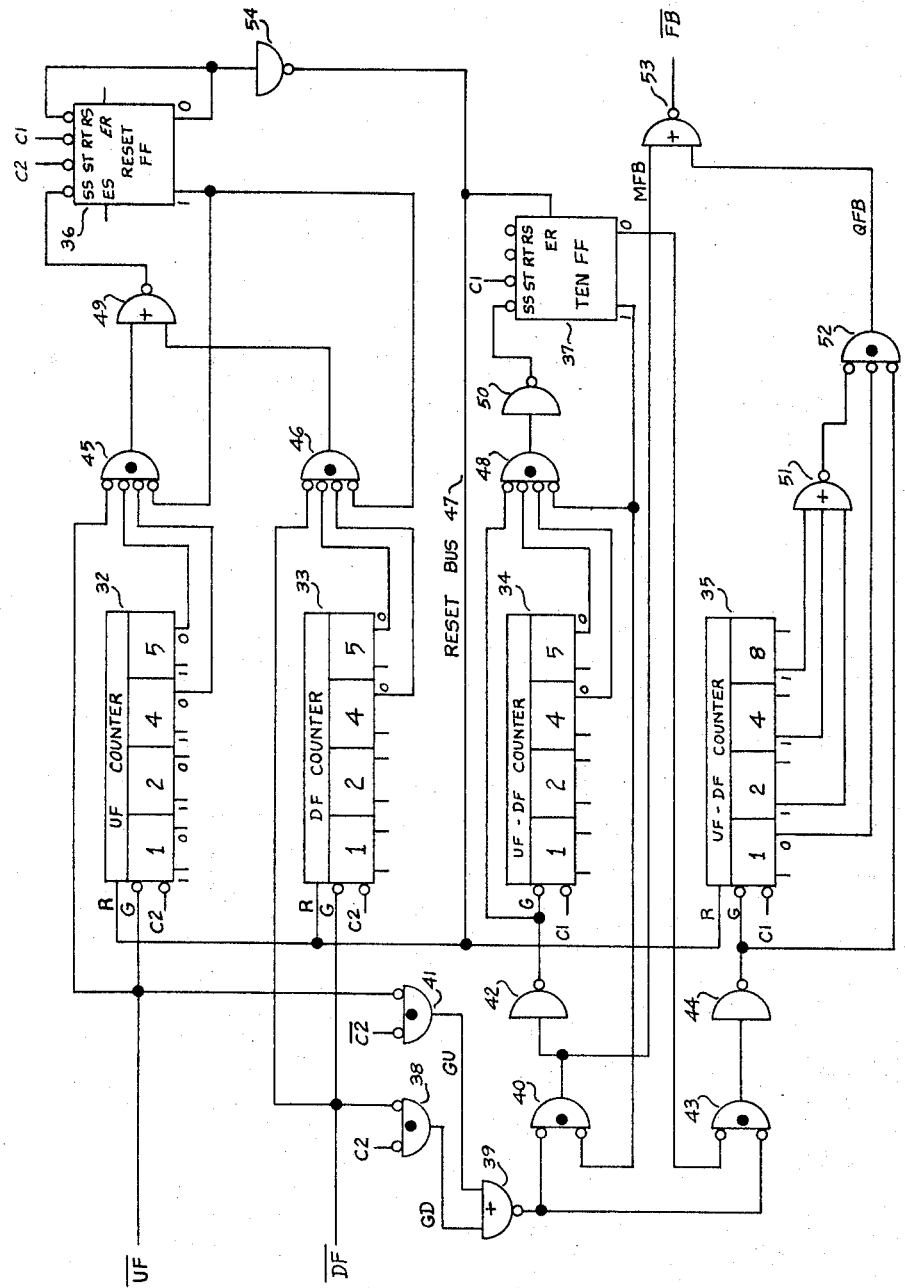
FIGURE 2 shows a circuit diagram of the vector signal computer shown in block diagram in FIGURE 1.

In order that an absolute velocity control be provided in accordance with the invention, the switch 16 is positioned so that the contouring velocity pulses $\overline{\text{CV}}$ are supplied to the absolute feedrate velocity control of the invention for comparison with the $\overline{\text{UF}}$ and $\overline{\text{DF}}$ pulses. On the basis of the compared rates or time durations, modified contouring velocity pulses $\overline{\text{CV}}'$ are applied to the contouring function generator 17. In accordance with the invention, the $\overline{\text{UF}}$ and $\overline{\text{DF}}$ pulses produced by the contouring function generator 17 are supplied to a vector pulse computer 30 which is shown as a block diagram in FIGURE 1. A circuit diagram of the vector pulse computer 30 is shown in FIGURE 2 and will be explained in more detail hereinafter. Briefly, the vector pulse computer 30 vectorially adds the pulses or signals $\overline{\text{UF}}$ and $\overline{\text{DF}}$ and produces feedback or output pulses or signals $\overline{\text{FB}}$ having rates or time durations which are indicative of or proportional to the vector sum of the rates or time durations of the pulses $\overline{\text{UF}}$ and $\overline{\text{DF}}$. The rates or time durations of the output pulses $\overline{\text{FB}}$ are compared with the rates or time durations of the contouring velocity pulses $\overline{\text{CV}}$ in a comparison circuit 31 which is enclosed in the dashed lines as indicated in FIGURE 1. The comparison circuit 31 produces enabling pulses or signals $\overline{\text{CV}}'$ in response to the compared signals or pulses having rates or time durations that are within a predetermined range of each other.

Vector pulse computer

The vector pulse computer of FIGURE 2 (as well as the comparison circuit of FIGURE 1) comprises a number of logic circuits which are individually known in the art. However, a brief description of these individual circuits will be given. As shown in FIGURE 2, the computer includes a number of counters such as the UF counter 32. The counters include four flip-flops having the indicated decimal weights, and may count upward at an applied C1 or C2 rate when they are enabled by a logic 0 applied to a gate input G. The counters may also be reset by the application of a logic 1 at the reset input R. Counts are indicated in the respective flip-flops by the output terminal 1 being at a logic 1. If no count is present in a given flip-flop, the output terminal 1 is at a logic 0 and the output terminal 0 is at a logic 1. The computer also comprises a number of NOR logic gates such as the four-input gate 45 and the two-input gate 49. These gates are arranged so that if any one of their inputs is at a logic 1, then a logic 0 output is produced. If all of the inputs are at a logic 0, then a logic 1 output is produced. All of the gates shown are NOR gates, but those with a plus represent an OR function followed by an inversion and those with a dot represent an AND function preceded by an inversion. A number of logic inverters, such as the inverter 54, are utilized. These inverters invert or change the logic applied to the input to the opposite logic at the output. And finally, the computer comprises a number of flip-flops such as the reset flip-flop 36. The flip-flops have an output terminal 1 and an output terminal 0. When a flip-flop is in the set condition, its output terminal 1 is at a logic 1 and its output terminal 0 is at a logic 0. When a flip-flop is in the reset condition, its output terminal 1 is at a logic 0 and its output terminal 0 is at a logic 1. A flip-flop may be set by applying a logic 0 to the set steering input SS followed by a transition from logic 1 to logic 0 applied to the set trigger input ST. Likewise, a flip-flop may be reset by applying a logic 0 to the reset steering input RS followed by a transition from logic 1 to logic 0 applied to the reset trigger input RT. A flip-flop may also be set by a logic 1 applied to the electronic set input ES, and may be reset by a logic 1 applied to the electronic reset input ER. Simultaneous application of logic 0 to the set steering and reset steering inputs SS, RS followed by simultaneous application of triggers to the set and reset trigger inputs ST, RT is not permitted.

The vector pulse computer receives $\overline{\text{UF}}$ and $\overline{\text{DF}}$ pulses from the function generator 17. These pulses are respectively applied to the gate inputs G of the UF counter 32 and the DF counter 33. When either of the $\overline{\text{UF}}$ or $\overline{\text{DF}}$ pulses is at a logic 0, its respective counter counts upward at the C2 rate. When either of the counters 32, 33 reaches a count of nine, its four and five weighted flip-flops respectively supply a logic 0 to the gates 45, 46. When the next pulse for the counter having a count of nine is received, the next C2 pulse simultaneously changes that counter state from nine to zero and sets the reset flip-flop 36. This is accomplished through the appropriate one of the gates 45, 46 which produces a logic 1, and a gate 49 which produces a logic 0 at the set steering input SS of the reset flip-flop 36. When the reset flip-flop 36 becomes set, its output terminal 0 produces a logic 0 which is inverted by an inverter 54 to produce a logic 1 on a reset bus 47. This resets counters 32, 33, 35, and a ten flip-flop 37. The reset flip-flop 36 becomes reset again on the next C1 pulse.

The $\overline{DF}$ and $\overline{UF}$ pulses are also applied to gates 38, 41 respectively along with the C2 and $\overline{C2}$ signals. The outputs of these gates 38, 41 provide GD and GU pulses that are applied to a gate 39. The output of the gate 39 is applied through a gate 40 and an inverter 42 to the gate input G of a UF-DF counter 34 and is also applied through a gate 43 and an inverter 44 to the gate input G of the UF-DF counter 35. Thus, the UF-DF counters 34, 35 count both the $\overline{UF}$ and $\overline{DF}$ signals. In a cycle of operation of the computer, if the ten flip-flop 37 is reset, its output terminal 1 is at a logic 0. The gate 40 passes $\overline{UF}$ and $\overline{DF}$ pulses which are applied as MFB pulses to a gate 53 that provides feedback or output pulses $\overline{FB}$ from the computer. After the UF-DF counter 34 reaches a count of nine, and when the next $\overline{UF}$ or $\overline{DF}$ pulse appears, all inputs of a gate 48 are at a logic 0. The gate 48 produces a logic 1 which is inverted by an inverter 50 to supply a logic 0 to the set steering input SS of the ten flip-flop 37. On the next C1 pulse, the ten flip-flop 37 is set so that its output terminal 1 is at a logic 1. This same C1 pulse changes the count in the UF-DF counter 34 from nine to zero. This logic 1, when applied through the gate 40 and the inverter 42 blocks further pulses to the UF-DF counter 34. The output terminal 0 of the ten flip-flop 37 is at a logic 0, and this permits the gate 43 to pass further $\overline{UF}$ and $\overline{DF}$ pulses to the UF-DF counter 35. Thus, the UF-DF counter 35 is enabled, and may count the $\overline{UF}$ and $\overline{DF}$ pulses after a combined total of ten such pulses have been supplied.

The output terminals 1 of the two, four, and eight weighted flip-flops of the UF-DF counter 35 are applied to a gate 51. The output of the gate 51 is applied to a gate 52. The output terminal 0 of the one weighted flip-flop of the UF-DF counter 35 also applied to the gate 52. And the output of the inverter 44 is also applied to the gate 52. The gate 52 provides the vectorial addition or summation of the $\overline{UF}$ and $\overline{DF}$ pulses after a combined total of ten such pulses have been received. The gate 52 produces QFB pulses when the UF-DF counter 35 counts from 3 to 4, and from 5 to 6, and from 7 to 8, and from 9 to 10. Thus, after the first combined total of ten $\overline{UF}$ and $\overline{DF}$ pulses of a cycle are received, the UF-DF counter 35 may then count pulses, these being the next group of up to a maximum of ten $\overline{UF}$ and $\overline{DF}$ pulses in the cycle. The QFB pulses produced by the gate 52 and the MFB pulses produced by the gate 40 are supplied to the gate 53. When either of the inputs to the gate 53 is at a logic 1, the gate 53 produces a feedback or output signal $\overline{FB}$ of logic 0. The number of $\overline{FB}$ is auctually the number of intervals that the $\overline{FB}$ signals is at logic 0 prior to the rise of a C1 pulse. And during the time that the feedback signal $\overline{FB}$ is at a logic 0, this indicates that $\overline{UF}$ and $\overline{DF}$ pulses are being received. And the total number of feedback pulses $\overline{FB}$ as above defined is indicative of the vector sum of the time duration of the $\overline{UF}$ and $\overline{DF}$ pulses. A cycle of operation may include a combined total between ten and twenty $\overline{UF}$ and $\overline{DF}$ pulses. If motion were along one axis only there would be only ten $\overline{UF}$ pulses or ten $\overline{DF}$ pulses. If motion were at 45 degrees with respect to two perpendicular axes, then there would be a combined total of twenty $\overline{UF}$ and $\overline{DF}$ pulses, this total having ten $\overline{UF}$ pulses and ten $\overline{DF}$ pulses. For motions in directions between one axis and a 45 degree angle, a combined total of between ten and twenty $\overline{UF}$ and $\overline{DF}$ pulses constitutes one cycle of operation. For motion in a direction other than a 45 degree angle, either the UF counter 32 or the DF counter 33 will first count to ten, and this will end one cycle of operation. When motion is along a 45 degree angle, both the UF counter 32 and the DF counter 33 will reach a count of ten at the same time and end a cycle of operation. When a cycle of operation is ended, the reset flip-flop 36 is set and this resets the counters 32, 33, 35 if they have not counted precisely from nine to zero. The counter 34 needs no resetting since it always receives exactly ten pulses in a cycle.

In a cycle of operation, ten feedback pulses $\overline{FB}$ are provided by the computer for the first ten combined $\overline{UF}$ and $\overline{DF}$ pulses. If all of the first ten pulses are $\overline{UF}$ pulses or if all of the first ten pulses are $\overline{DF}$ pulses, the motion is along only one axis and the computer is then reset. For any other motion, the computer produces an additional $\overline{FB}$ pulse when the total of the $\overline{UF}$ and $\overline{DF}$ pulses becomes fourteen, sixteen, eighteen, and twenty. Thus, four more $\overline{FB}$ pulses may be provided, the exact number being a vectorial approximation of the total $\overline{UF}$ and $\overline{DF}$ pulses. As an example, if the motion is along an angle of 45 degrees, twenty $\overline{UF}$ and $\overline{DF}$ pulses are sampled in a cycle, and fourteen $\overline{FB}$ pulses are provided. Actually, the square root of 200 or 14.14 $\overline{FB}$ pulses would be needed to provide a more accurate vector addition. And, of course, some motions, such as along one axis or at certain angles, will have an accurate vector addition. This basis selected represents a good compromise from the standpoint of circuit simplicity and accuracy. If greater accuracy is desired, the sampling interval of ten pulses on either axis may be increased to 16, 32, or 100 pulses on either axis. This accuracy requires additional counters and logic elements. This represents a matter of choice depending upon the needs of the absolute feedrate velocity control, and is a choice that comes within the scope of the invention de described.

*Comparison circuit*

The circuit diagram of the comparison circuit 31 of the invention is shown in FIGURE 1. The comparison circuit 31 comprises logic gates and a comparison circuit counter 68 that function as described for comparable elements in FIGURE 2. The counter 68 is somewhat different in that it is a reversible binary (not binary coded decimal) counter that may count up at a C1 rate when the count up input is at a logic 0 and that may count down at the C1 rate when the count down input is at a logic 0. The logic circuits prevent the count up and count down inputs from being at a logic 0 at the same time. The output terminals 1 of the one, two, and four weighted flip-flops of the counter 68 are coupled to a gate 67 so the gate 67 produces a logic 0 when the counter 68 has a count between one and seven inclusive and between nine and fifteen inclusive. Counts between nine and fifteen are blocked by a gate 69 coupled to the output terminal 1 of the eight flip-flop and to the gate 67. An inverter 70 is coupled to the gate 69 and produces enabling pulses $\overline{CV'}$ for the comparison circuit 31. When the counter 68 has a count between one and seven, the gate 69 produces a logic 1 which, when inverted by the inverter 70, produces an enabling pulse $\overline{CV'}$ of logic 0. When the pulse $\overline{CV'}$ is at a logic 0, the contouring function generator 17 is enabled and may produce $\overline{UF}$ and $\overline{DF}$ pulses. A gate 66 is coupled to the output terminals 0 of the one, two, four, and eight weighted flip-flops so that when the counter 68 has a count of seven, the gate 66 produces a logic 1 which causes a gate 63 to produce a logic 0. This logic 0 is inverted by an inverter 64 to a logic 1 so that the counter 68 may not count upward. Thus, when the counter 68 has a count of seven, it may not count upward any further, but may only count downward.

The comparison circuit counter 68 may count up when a gate 63 produces a logic 1 which is inverted to a logic 0 by an inverter 64. The gate 63 produces a logic 1 when the contouring velocity pulses $\overline{CV}$ are logic 0, when the feedback pulses $\overline{FB}$ are logic 1 (which is inverted to logic 0 by an inverter 60), when the gate 66 produces logic 0 (i.e., the counter 68 does not have a count of seven), and when the $\overline{C2}$ pulses are logic 0. In other words, a count up takes place during the logic 0 state of $\overline{C2}$ pulses when a contouring velocity pulse $\overline{CV}$ is received, when a feedback pulse $\overline{FB}$ is not received, and if the counter 68 does not have a count of seven. The counter 68 may count down when a gate 62 produces a logic 1 that is inverted by an inverter 65 to a logic 0. The gate 62 produces a logic 1 when both its inputs are at a logic 0, and this occurs when the feedback pulses $\overline{FB}$ are logic 0 and when the contouring velocity pulses $\overline{CV}$ or the $\overline{C2}$ pulses are logic 1. In other words, a count down takes place when a feedback pulse $\overline{FB}$ is received and when a contouring velocity pulse $\overline{CV}$ is not received or when the $\overline{C2}$ pulses are logic 1. If an $\overline{FB}$ pulse and a $\overline{CV}$ pulse occur at the same time (i.e., are both logic 0 at the same time), the counter 68 does not count, thereby canceling a count up pulse with a count down pulse.

It will thus be seen that the comparison circuit 31 is arranged to compare the time duration or pulse rate of the feedback pulses $\overline{FB}$ and the contouring velocity pulses $\overline{CV}$. If, through a programming error, the rate of the $\overline{CV}$ pulses exceeds the maximum possible rate of the $\overline{FB}$ pulses, the comparison circuit 31 permits the rate or duration of the contouring velocity pulses $\overline{CV}$ to exceed the rate or duration of the feedback pulses $\overline{FB}$ while still maintaining the maximum duration of the enabling pulses $\overline{CV}'$. This is accomplished by preventing the counter 68 from counting above the seven state. Counts of 8 to 15 inclusive may be regarded as a negative count in the counter 68, and these counts of 8 to 15 inclusive cause the $\overline{CV}'$ signal to disable or stop the function generator 17. In other words, the 1 through 7 states of the counter 68 are assigned the logic function of enabling the function generator 17 to generate pulses, while the states 0 and 8 through 15 (equivalent to minus 1 through 8 inclusive) block the operation of the function generator 17. If the number of $\overline{FB}$ pulses exceeds the number of $\overline{CV}$ pulses so that the counter state goes downward to zero, the $\overline{CV}'$ pulse disables the function generator 17. Thus, the function generator 17 will produce only a few more $\overline{UF}$ and $\overline{DF}$ pulses which are in the computing process. These few $\overline{UF}$ and $\overline{DF}$ pulses will not produce enough $\overline{FB}$ pulses to take the counter state much below 15. In the other direction where the number of $\overline{CV}$ pulses has so exceeded the number of $\overline{FB}$ pulses that the counter 68 has a count of 7 and will not accept any more $\overline{CV}$ pulses, any $\overline{CV}$ pulses which are received are lost. However, these lost $\overline{CV}$ pulses do not disturb the overall operation, since such lost $\overline{CV}$ pulses only represent a velocity which the control could not provide with the function generator 17 continuously enabled. While the changes produced by the absolute feedrate velocity control of the invention may seem appreciable, it should be noted that these changes take place at relatively high frequencies and during extremely short time intervals. Thus, the effect of such changes is eliminated through the electrical and mechanical inertia of the rest of the control system, thereby resulting in a physical velocity that is smooth, uniform, and accurate with respect to the command.

The output terminal 0 of the four flip-flop of the counter 68 is also coupled to a gate 71 along with a function generator control gate signal $\overline{FGCG}$. When the counter 68 reaches a count of four, this causes the gate 71 to set a function generator scale of ten flip-flop 73 so that the contouring function generator 17 may be operated at a faster rate in response to the signals FGS10 and $\overline{FGS10}$. This is desirable where a relatively short contour is being produced, or a relatively high absolute velocity is commanded. The faster rate is also provided when the absolute velocity command of a block of data for a section of contour path is recognized as being in the high range by a high feedrate signal of logic 1 on the ES input of flip-flop 73. A transfer reset signal TRS is provided to reset the counter 68 and the flip-flop 73 just prior to the start of processing each new block of command data.

*Operation*

Figure 3A:
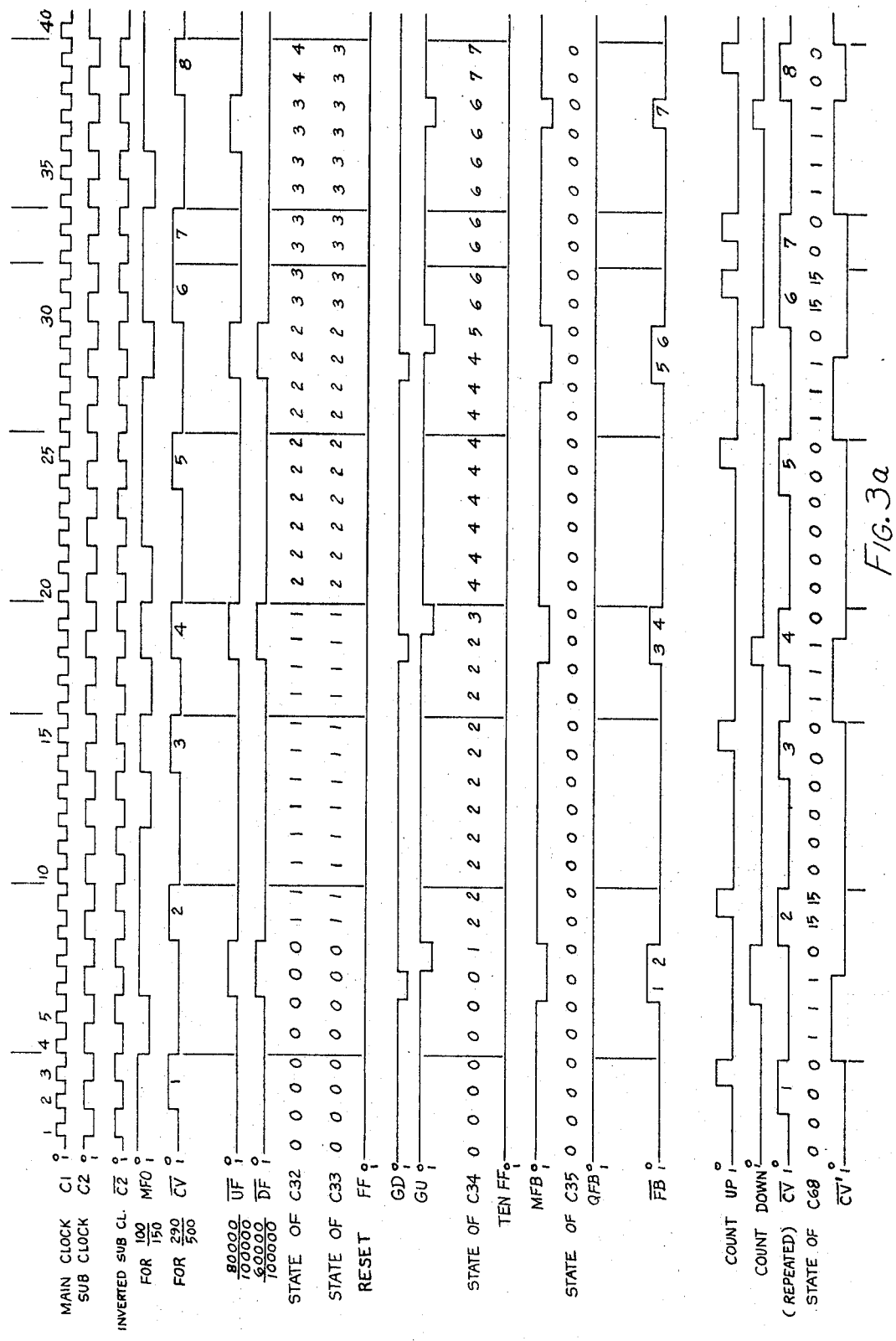

FIGURES 3a and 3b show waveforms which are helpful in understanding the operation of the absolute feedrate velocity control of the invention. Although the waveforms are shown in two figures, they are actually continuous with respect to time, and should be considered joined at the right and left edges of FIGURES 3a and 3b. The waveforms of FIGURES 3a and 3b are plotted with respect to the C1 pulses which are positioned at the top of the waveforms. It has been assumed that the command calls for a relatively long contouring motion and a relatively high speed so as to compress the waveforms into a relatively small space. From the top waveform downward, there are shown the C1 pulses with the number of the C1 pulses indicated. Next are the C2 and $\overline{C2}$ pulses. Next are the manual feed speed override pulses $\overline{MFO}$ for a 100 percent setting which is equivalent to 100 out of each 150 successive pulses. Next are the contouring velocity pulses $\overline{CV}$ for an absolute contouring velocity of 290 inches per minute out of a possible 500 inches per minute. Next are the $\overline{UF}$ and $\overline{DF}$ pulses as they would appear for a contouring distance of 8 inches along the Y axis and 6 inches along the X axis, these distances being indicated by the 80,000 and 60,000 out of a possible 100,000 pulses. Next are the states of the UF counter 32 and the DF counter 33, these states being indicated by numbers representing the count in the counters. Next is shown the state of the rest flip-flop 36, the upper level indicating the reset condition and the lower level indicating the set condition. Next are shown the GD and GU pulses provided by the gates 38, 41. Next is shown the state of the UF-DF counter 34, this state being indicated by numbers representing the count in this counter 34. Next is shown the state of the ten flip-flop 37, the upper level indicating that the flip-flop is reset and the lower level indicating that the flip-flop is set. Next is shown the occurrence of the MFB pulses applied to the gate 53. Next is shown the state of the UF-DF counter 35, this state being indicated by count numbers. Next is shown the occurrence of the QFB pulses applied to the gate 53. The $\overline{FB}$ pulses provided by the computer 30 for the $\overline{UF}$ and $\overline{DF}$ pulses are shown next. The occurrence of the count up and count down signals applied to the comparison circuit counter 68 is shown next, the upper level of these signals indicating when the counter 68 can count up or down. The contouring velocity pulses $\overline{CV}$ are repeated again, and these are followed by the state of the comparison circuit counter 68. This state is indicated by numbers indicating the count in ths counter 68. And finally at the bottom is shown the enabling pulses $\overline{CV}'$, the enabling condition of these pulses being indicated by the upper level of the waveform.

In view of the previous explanation, it is believed that the waveforms shown in FIGURES 3a and 3b are self-explanatory. However, some features will be pointed out. First, it will be seen how the GD and GU pulses appear at approximately the same times as their respective $\overline{UF}$ and $\overline{DF}$ pulses. It will also be seen that the sixth $\overline{UF}$ pulse appears at the fifty-second C1 pulse and the fifth $\overline{DF}$ pulse appears also at the fifty-second C1 pulse. Thus, the UF-DF counter 34 reaches a count of ten or zero as indicated at the fifty-third C1 pulse. When the UF-DF counter 34 reaches a count of ten or zero, this causes the ten flip-flop 37 to become set as indicated at the fifty-third C1 pulse. It will also be seen that ten MFB pulses have been provided by the end of the fifty-second C1 pulse, some of the MFB pulses having twice the duration of other MFB pulses and thus being equivalent to two such pulses. The count up pulses occur in response to the $\overline{CV}$ pulses, and the count down pulses or signals occur in response to the $\overline{FB}$ pulses. It will be seen that when these count up or count down pulses are applied to the comparison circuit counter 68, they cause the counter 68 to change its count at appropriate times as indicated. Thus, the counter starts with a zero count, up to a one count, down to a zero count, down to a 15 count, up to a zero count, up to a one count, down to a zero count, up to a one count, down to zero count, down to a 15 count, up to a zero count, and so on.

The enabling pulses $\overline{CV}'$ thus enable the contouring function generator 17 to produce $\overline{UF}$ and $\overline{DF}$ pulses at a rate or with a time duration such that the resultant velocity is absolute and agrees with the commanded velocity indicated by the numerical data input equipment 10 and by the contouring velocity pulses $\overline{CV}$.

Conclusion

It will thus be seen that the invention provides a novel and improved absolute feedrate velocity control for use with numerical contouring control systems using only digital computations and circuits. Although the embodiment shown and described provides an absolute control for two axes, it is to be understood that the control may operate with more than two axes. Also, it is to be understood that other specific elements and ranges may be provided. For example, the comparison circuit counter 68 may have associated logic circuits such that its range of a count upward of seven and a count downward of eight may be expanded, or compressed, or shifted. Therefore, while the invention has been described with reference to a particular embodiment, it is to be understood that modifications may be made without departing from the spirit of the invention or from the scope of the claims.

What I claim as new and desire to secure by Letters Patent of the United States is:

1. A control comprising a source of recurrent signals whose recurrence rate is indicative of a desired resultant velocity, a normally inoperative function generator responsive to enabling signals to become operative and provide a plurality of recurrent component signals whose recurrence rate is indicative of velocity along a plurality of axes, a velocity control comprising a computer adapted to be coupled to the output of said function generator for producing recurrent output signals whose number is indicative of the vector sum of said component signals, and a comparison circuit coupled to said computer and responsive to each of said recurrent signals for producing said enabling signals in response to said number of output signals and the number of said source signals being within a predetermined range of each other, and means for applying said enabling signals to said function generator.

2. In a numerical contouring control having a source of digital pulses having a recurrence rate indicative of a desired resultant velocity and having a function generator that resolves said pulses into two or more component digital pulses whose recurrence rates are respectively indicative of velocity along two or more axes, a velocity control comprising a computer adapted to be coupled to said function generator for producing recurrent output pulses whose number is indicative of the vector sum of said component pulses; and a comparison circuit coupled to said computer and adapted to be coupled to said source and to said function generator for producing an enabling signal in response to the number of said output pulses and the number of said source pulses being within a predetermined range of each other.

3. In a numerical contouring control having a source of pulses whose rate indicates a desired resultant velocity and having a function generator that resolves said pulses into a plurality of component pulses whose respective rates indicate velocity along a plurality of axes, a velocity control comprising a computer coupled to said function generator for producing output pulses whose number is indicative of the vector sum of said component pulses; a comparison circuit coupled to said computer and to said source for producing an enabling signal only in response to the number of said output pulses and the number of said source pulses being within a predetermined range of each other; and means coupled to said function generator for selectively providing said function generator with said source pulses or with said enabling signal.

4. A velocity control circuit for a numerical contouring control having a velocity generator that produces velocity pulses having a rate that effectively indicates a desired velocity and having a function generator for resolving velocity pulses into a plurality of component pulses at outputs, said component pulses having a rate that effectively indicates desired velocities along respective component axes comprising a pulse computer coupled to said outputs of said function generator for producing a plurality of output pulses whose number represents the vector sum of said component pulses; a comparison circuit coupled to said velocity generator and to said pulse computer for comparing the number of said velocity pulses with the number of said output pulses and for producing an enabling signal in response to said compared numbers being within a predetermined range of each other; and means coupling said comparison circuit to said function generator whereby said function generator may produce said component pulses in response to said enabling signal.

5. A velocity control circuit for a numerical contouring control having a velocity generator that produces successive velocity pulses at an output, said velocity pulses having a rate that effectively indicates a desired velocity, and having a function generator for producing a plurality of components of successive pulses at outputs, each of said components of pulses having a rate that effectively indicates desired velocities along respective component axes comprising a pulse computer coupled to said outputs of said function generator for producing, at an output, an output pulse in response to each component pulse of a first quantity of component pulses of a predetermined total number of component pulses, and for producing an output pulse in response to further predetermined numbers of said component pulses of the remainder of said predetermined total number of component pulses; a comparison circuit coupled to said output of said velocity generator and coupled to said output of said pulse computer for indicating the difference in the total number of said velocity pulses and the total number of said output pulses, and for producing an enabling signal at an output in response to said difference being within a predetermined range; and means coupling said output of said comparison circuit to said function generator whereby said function generator may produce said components of pulses in response to said enabling signal.

6. The velocity control as defined in claim 5 wherein said predetermined range is in the excess of said total number of velocity pulses over said total number of output pulses.

7. A velocity control circuit for a numerical contouring control having a velocity generator that produces a train of velocity pulses of a rate that effectively indicates a desired velocity, and having a function generator for producing a plurality of component trains of pulses, each of said component trains of pulses having a rate that effectively indicates desired velocities along respective component axes comprising a pulse computer coupled to said function generator for sampling said pulses of said component trains by amounts between a minimum quantity and a maximum quantity of said pulses of said component trains and for producing an output pulse in response to each sampled pulse in said minimum quantity of an amount, and for producing an output pulse in response to predetermined numbers of said sampled pulses in the remainder of said amount; a comparison circuit coupled to said velocity generator and to said pulse computer for indicating the difference in the total number of said velocity pulses and the total number of said output pulses, and for producing an enabling signal in response to said difference being within a predetermined range; and means coupling said comparison circuit to said function generator whereby said function generator may produce said component trains of pulses in response to said enabling signal.

8. A velocity control circuit for a numerical contouring control having a velocity generator that produces a train of velocity pulses of a rate that effectively indicates a desired velocity, and having a function generator for producing a plurality of component trains of pulses, each of said component trains of pulses having a rate that effectively indicates desired velocities along respective component axes comprising a pulse computer coupled to said function generator for sampling said pulses of said component trains by amounts between a minimum quantity and a maximum quantity of said pulses of said component trains and for producing an output pulse in response to each sampled pulse in said minimum quantity of an amount, and for producing an output pulse in response to predetermined numbers of said sampled pulses in the remainder of said amount; a comparison circuit coupled to said velocity generator and to said pulse computer for counting in one direction in response to said velocity pulses and for counting in the opposite direction in response to said output pulses and for producing an enabling signal in response to the difference in said countings being within a predetermined range; and means coupling said comparison circuit to said function generator whereby said function generator may produce said component trains of pulses in response to said enabling signal.

9. The velocity control as defined in claim 8 wherein said predetermined range lies between said counted number of velocity pulses exceeding said counted number of output pulses.

10. The velocity control as defined in claim 8 wherein said comparison circuit counts said velocity pulses only when the counted number of said velocity pulses exceeds the counted number of said output pulses by less than a predetermined amount.

References Cited

UNITED STATES PATENTS 2,927,735    3/1960    Scuitto.

ORIS L. RADER, *Primary Examiner.*

T. E. LYNCH, *Assistant Examiner.*

U.S. Cl. X.R.

235—151.11; 318—28, 162